(12) United States Patent
Vulpitta

(10) Patent No.: US 9,261,203 B2
(45) Date of Patent: Feb. 16, 2016

(54) INFLATABLE FAUCET INSULATION

(75) Inventor: Brian A. Vulpitta, Avon Lake, OH (US)

(73) Assignee: Shurtech Brands, LLC, Avon, OH (US)

( * ) Notice: Subject to any disclaimer, the term of this patent is extended or adjusted under 35 U.S.C. 154(b) by 762 days.

(21) Appl. No.: 13/230,116

(22) Filed: Sep. 12, 2011

(65) Prior Publication Data
US 2012/0067439 A1 Mar. 22, 2012

Related U.S. Application Data

(60) Provisional application No. 61/383,828, filed on Sep. 17, 2010.

(51) Int. Cl.
F16K 27/12 (2006.01)
E03B 9/02 (2006.01)
F16K 35/10 (2006.01)

(52) U.S. Cl.
CPC .............. *F16K 27/12* (2013.01); *E03B 9/027* (2013.01); *F16K 35/10* (2013.01); *Y10T 137/7058* (2015.04)

(58) Field of Classification Search
CPC ........................................................ F16K 27/12
USPC .................. 137/381, 380, 382, 377, 360, 383
See application file for complete search history.

(56) References Cited

U.S. PATENT DOCUMENTS

| | | | | |
|---|---|---|---|---|
| 2,985,552 | A | | 5/1961 | Watanabe |
| 3,857,117 | A | * | 12/1974 | Tenowitz ...................... 2/171.03 |
| 4,023,220 | A | * | 5/1977 | Younker ............................ 4/580 |
| 4,142,565 | A | | 3/1979 | Plunkett, Sr. |
| 4,651,360 | A | * | 3/1987 | Wang ................................ 4/506 |
| 4,709,429 | A | * | 12/1987 | Lerner et al. ...................... 4/661 |
| 4,901,481 | A | * | 2/1990 | Seeley, Jr. ............... E04H 15/20 52/2.15 |
| D349,754 | S | | 8/1994 | Pawar et al. |
| 5,433,030 | A | * | 7/1995 | Lehman .................... A01G 9/16 47/17 |
| 5,735,000 | A | * | 4/1998 | Pfaeffle .......................... 4/572.1 |
| 5,878,776 | A | | 3/1999 | Love |
| D409,707 | S | * | 5/1999 | Peterson ...................... D21/815 |
| 6,192,633 | B1 | * | 2/2001 | Hilbert .................. E04H 1/1277 52/2.18 |
| 6,206,030 | B1 | * | 3/2001 | Barthuly ....................... 137/341 |
| 6,520,201 | B2 | | 2/2003 | Sweeney et al. |
| 6,640,825 | B2 | | 11/2003 | McAtarian |
| D486,205 | S | | 2/2004 | Petschek |
| 6,820,639 | B2 | | 11/2004 | Petschek |
| 7,726,484 | B2 | * | 6/2010 | Komatsu .............. B65D 81/052 206/522 |
| 2003/0019024 | A1 | * | 1/2003 | Tompkins ......................... 4/506 |
| 2004/0084086 | A1 | * | 5/2004 | Stachowiak ............ F16K 27/12 137/382 |
| 2008/0201931 | A1 | * | 8/2008 | West ..................... E04H 4/0012 29/428 |
| 2009/0071682 | A1 | | 3/2009 | Crawford, Jr. |
| 2009/0151647 | A1 | * | 6/2009 | Burrows ....................... 119/513 |

* cited by examiner

Primary Examiner — John K Fristoe, Jr.
Assistant Examiner — Christopher Ballman
(74) Attorney, Agent, or Firm — Fay Sharp LLP; Karl W. Hauber

(57) ABSTRACT

A seasonal insulative cover for an outdoor faucet includes at least two layers formed from a weatherproof material. A first and a second of the at least two layers are further connected to define a space there between. The first and second layers include a plurality of air chambers. A valve is included on the cover for inserting air between the at least two layers. Air inflated into the insulative cover at the valve urges the first of the at least two layers to partially conform to the outdoor faucet. The air further creates the space surrounding the outdoor faucet between the at least two layers. The space contains a volume of stationary air, which prevents a movement of air current from transferring heat from the outdoor faucet to an outdoor environment.

15 Claims, 5 Drawing Sheets

INFLATABLE FAUCET INSULATION

This application claims the benefit of priority to U.S. Provisional Patent Application No. 61/383,828, filed Sep. 17, 2010, entitled "INFLATABLE FAUCET INSULATOR", by Brian A. Vulpitta, the disclosure of which is hereby incorporated by reference in its entirety.

BACKGROUND

The present disclosure is related to an inflatable faucet insulator and, more specifically, to an insulator including at least one weatherproof layer and at least one air chamber, which defines a space for containing a volume of stationary air.

An outdoor faucet is a controllable valve for selectively delivering a water supply to a region outside a structure. The outdoor faucet typically includes exposed components attached to a water line. The water line is often not easily accessible as it may be situated in crawl spaces or walls of the structure. During warmer seasons, water travels through the water line for delivery at the faucet head. Water left in the water line or faucet can freeze during colder seasons. The frozen water can cause the water line or pipe to expand, thus resulting in potential cracks and breakage of the pipe or water line. When the temperature warms again, the breakage causes leaks that damage the walls and other spaces of the structure. Trapped moisture from a leak that finds its way inside these walls may cause the paint to bubble, peel, and crack. The trapped moisture may aid in mold growth.

Replacement of the pipe is both a costly and a timely project. The project requires, at a minimum, an access first be created to the pipe and then the access be resealed after the pipe is replaced.

In many structures, the water line or pipe is insulated or contained within an insulated space. The faucet, however, is exposed to outside weather conditions. The faucet is often metal and conducts heat well. If the faucet becomes very cold, it may draw heat from the water line, thus causing the faucet to freeze even if it is otherwise insulated. Because the water pipes are prone to freeze when faucets are chilled, it is desirable to insulate the exposed faucet components.

BRIEF DESCRIPTION

A first exemplary embodiment of the present disclosure includes an outdoor faucet cover for insulating an outdoor faucet in freezing climates. The cover includes a selectively inflatable insulator body defined by a first open end, a closed end opposite the open end, and at least one continuous sidewall between the closed end and the open end. The continuous sidewall forms at least one air chamber. A cavity is formed within the inflatable body for receipt of the faucet. A valve is adapted for selectively receiving air inflated into the insulator body. The received volume of stationary air causes the air chamber to expand. At least a portion of the inner surface of the faucet cover is brought into contact with the faucet, holding the faucet cover in place.

A second exemplary embodiment of the present disclosure includes an insulator for covering an outdoor faucet during a season. The insulator includes a first weatherproof layer for partially conforming to an outdoor faucet body. The insulator further includes a second weatherproof layer for exposure to an outdoor environment. At least one inflatable chamber adapted to contain a stationary air layer is also included in the insulator between the first and the second weatherproof layers.

A third exemplary embodiment of the present disclosure includes a seasonal insulative cover for an outdoor faucet. The cover includes at least two layers formed from a weatherproof material. The at least two layers adapted to rest against each other in a first operative state. A valve is included on the cover selectively receiving air inflated between the at least two layers. The at least two layers being space apart in a second operative state. Air inflated into the insulative cover at the valve urges a first of the at least two layers to elastically conform at least partially to the outdoor faucet. The air further creates a space surrounding the outdoor faucet between the at least two layers. The space contains a volume of stationary air, which prevents a movement of air current from transferring heat from the outdoor faucet to an outdoor environment.

Other embodiments discussed herein include reusable and consumable inflatable structures having an independent, weatherproof cover. The inflatable structures include a first weatherproof layer adapted to engage an associated outdoor faucet body. The inflatable structures further include a second weatherproof layer adapted to be exposed to an associated outdoor environment. A selectively inflatable chamber is adapted to contain an air layer situated between the first and the second weatherproof layers.

DETAILED DESCRIPTION

Figure 1:
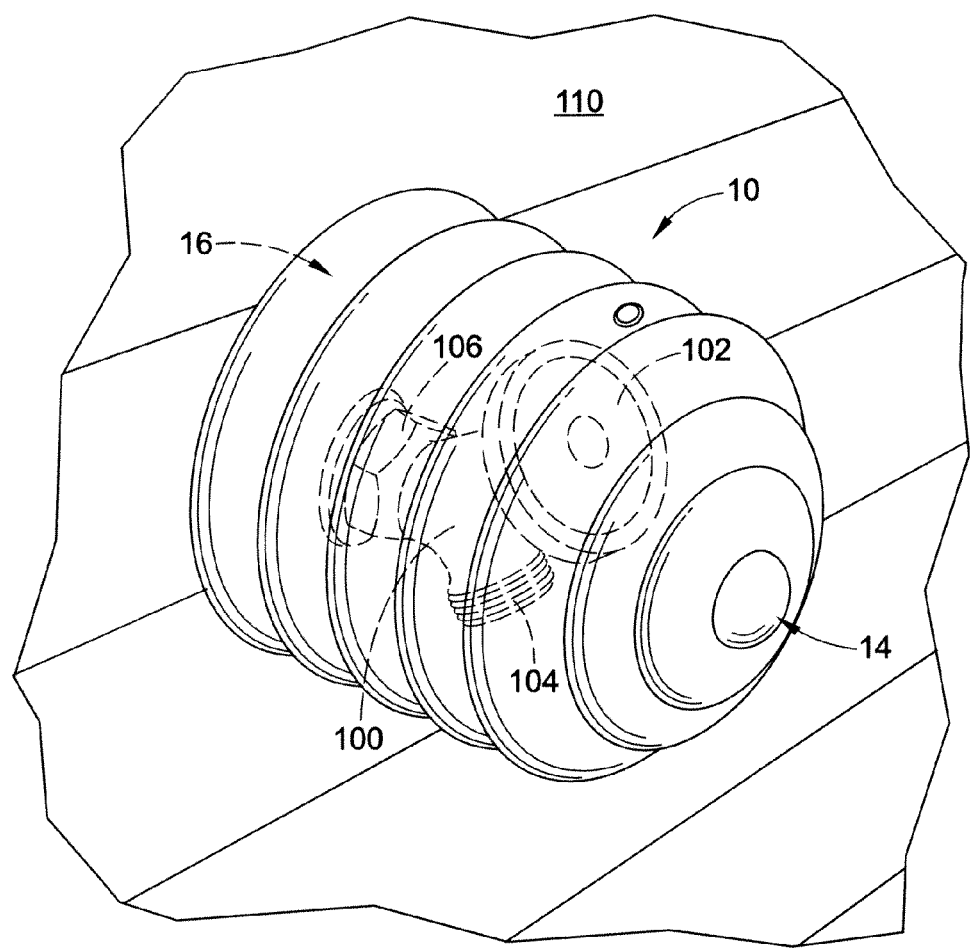
FIG. 1 illustrates a first embodiment of an inflatable faucet insulator in accordance with the present disclosure.

The present disclosure is related to an inflatable insulator that covers exposed components of an outdoor faucet. The disclosure is contemplated for use with water faucets that extend outwardly from a vertically extending wall defining a structure; however, the teachings for an inflatable insulator herein may be adapted for use with the exposed components of any outdoor water delivery system, such as, for example, free-standing faucets, sprinkler heads, fountain heads, and outdoor shower heads, etc.

An outdoor water faucet 100 is selected herein for purposes of describing the features of the present inflatable insulator 10. The exposed components of an outdoor faucet 100 may include, for example, a knob 102, a bonnet nut, a stem, a packing, a valve body, a seat washer screw, a valve seat, and a spout 104. The faucet includes a thread or other connector means at one end 106 for engagement with a water line (not shown). The water line extends inwardly through a wall and/or or crawl spaces of a structure.

Despite being removed from direct contact with the outdoors, a crack or a breakage in the water line may result from below-freezing dips in temperatures outdoors. During periods of use (i.e., during warmer seasons), water travels through the water line, whereupon the water selectively egresses the faucet spout 104 when the knob 102 lifts the valve from the valve seat. When the knob 102 selectively closes the valve, water is often left behind in the valve body and in the water pipe. This water freezes when the outdoor temperatures drop because the pipe loses heat through the outdoor faucet body 100. As the water freezes, it expands the pipe. The pipe can be cracked by the expanding freezing water with changes in pressure.

The present disclosure is directed toward an inflatable insulator 10 that completely envelopes the exposed faucet components to hinder heat loss from the water pipe through the faucet. One aspect of the present inflatable insulator 10 is an incorporation of a stationary air layer. Stationary air is an effective insulator because it prevents moving air currents from transferring heat from warmer bodies to cooler bodies and/or environments.

Figures 2, 3:
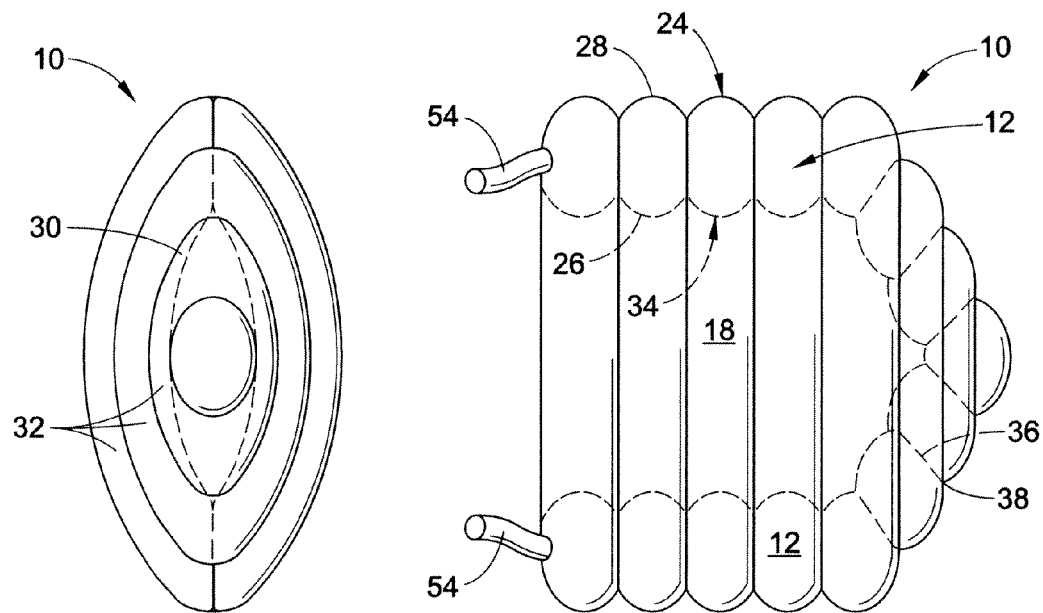
FIG. 2 illustrates a front view of a closed end of the insulator of FIG. 1, wherein the insulator is in a partially deflated state.
FIG. 3 illustrates a side view of the insulator of FIG. 1.

A first embodiment of the present disclosure is illustrated in FIGS. 1-4. The first embodiment is illustrated in FIG. 1 to be fully inflated over the faucet 100. One aspect of the faucet insulator embodiment disclosed herein is that the insulator can be delivered and stored flat in a deflated state. However, the inflatable insulator 10 may be inflated prior to its placement over the faucet 100. A front (or top) view of the insulator 10 is shown in FIG. 2 in the partially deflated state. The insulator 10 includes at least one air chamber 12 (shown partially deflated) having a generally conical shape. The air chamber 12 decreases in general size toward a closed end 14 of the inflatable insulator 10. The individual chambers are toroidial and resemble donuts. Opposite the closed end 14 is an opening 16 (shown in phantom). The air chamber 12 may decrease in general size toward the opening 16 as well. The opening 16 provides access to a cavity 18 (see FIG. 3), which is defined by a generally continuous sidewall 20 that is formed by the air chamber 12. The cavity 18 receives the faucet 100 (see FIG. 1) at the opening 16. The insulator 10 may be placed over the faucet in the partially deflated state or fully inflated to completely surround all the exposed components.

A valve 22, an air port, or a similar functioning feature is situated in a user-accessible position on the insulator 10. In one embodiment, the valve 22 may include a one-way valve construction that permits an input of air to selectively inflate the insulator 10 while prohibiting an outbound egress of air, which may have an effect of unintentionally deflating the insulator. In another contemplated embodiment, the valve 22 may include a two-way valve construction that permits a selective control of the amount of air contained in the at least one air chamber 12. For example, one aspect of the two-way valve is a selective deflation of the insulator 10 for removing the insulator 10 from engagement with the faucet 100 for accessing the faucet 100.

The valve 22 is situated on an exterior oriented surface 24 of the insulator 10. In one embodiment, the valve is positioned at a location on the sidewall that is conspicuous to a user. The valve 22 is utilized for inflating the insulator 10. Any manual or automatic means for inflating a deflated insulator body 10 (see FIG. 2) is contemplated herein without departing from a teaching and functions of the present disclosure. One embodiment is contemplated having a pump mechanism (not shown) that is provided in a kit with the disclosed insulator 10 to aid in assembling the insulator 10 from a deflated to an inflated state.

Figure 4:
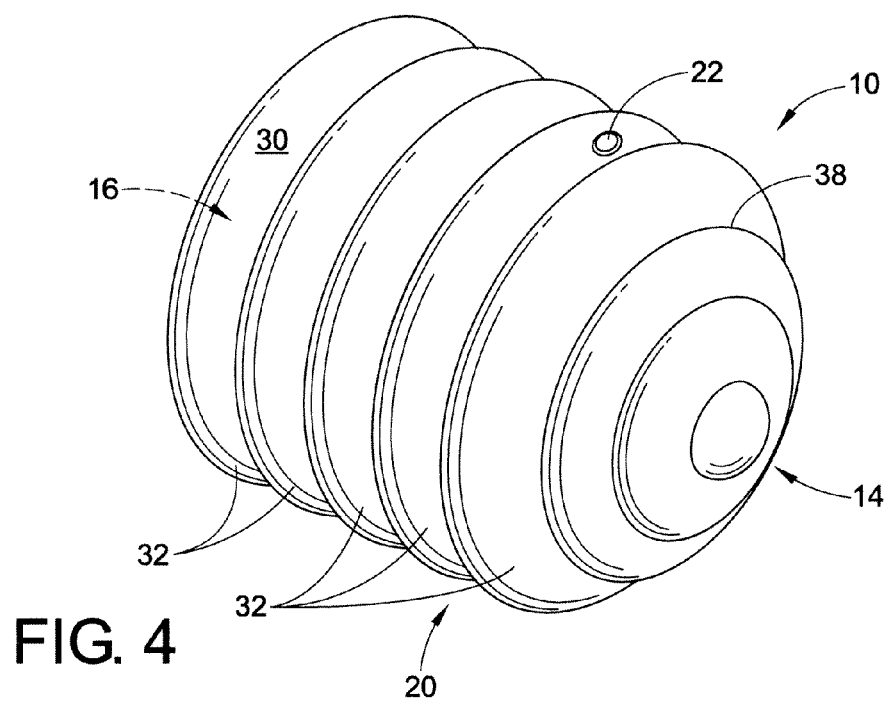
FIG. 4 illustrates a perspective view of the insulator of FIG. 1.
Figure 5:
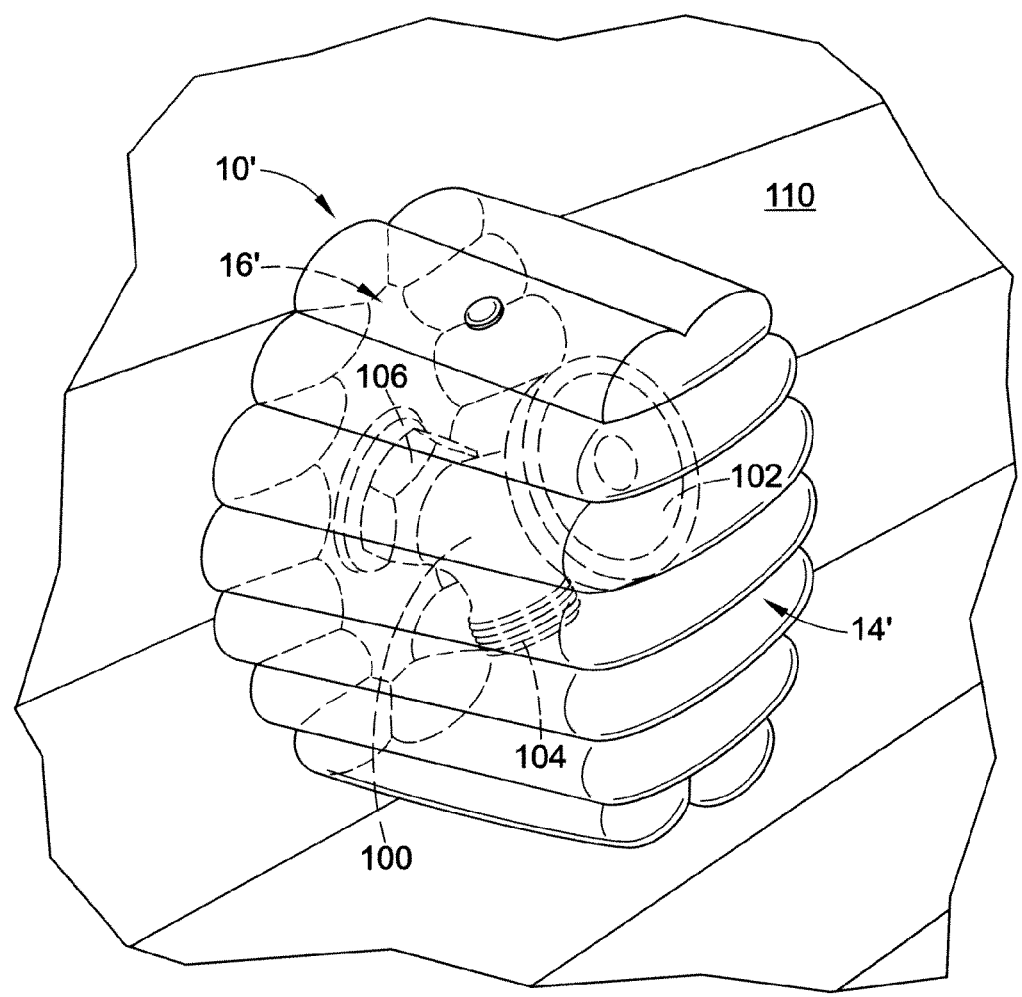
FIG. 5 illustrates a further embodiment of an inflatable faucet insulator in accordance with the present disclosure.
Figure 6:
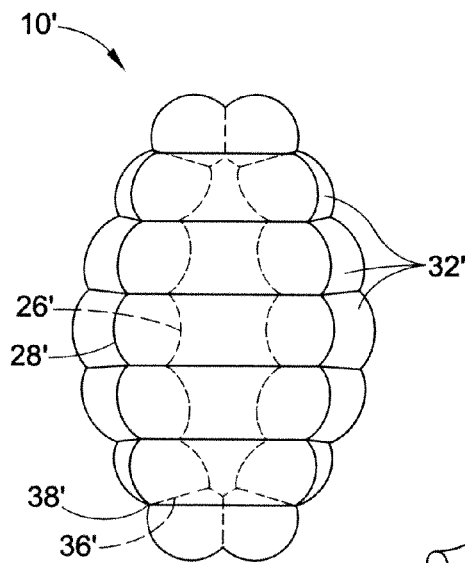
FIG. 6 illustrates a front view of a closed end of the insulator of FIG. 5, wherein the insulator is in a partially deflated state.
Figure 7:
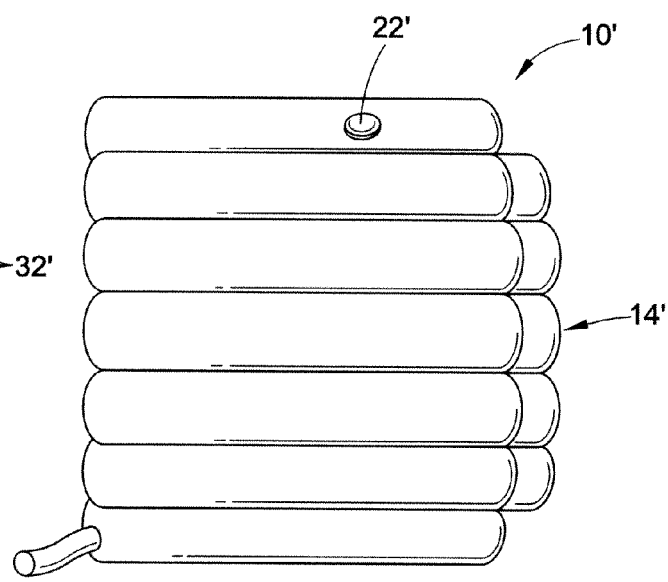
FIG. 7 illustrates a side view of the insulator of FIG. 5.
Figure 8:
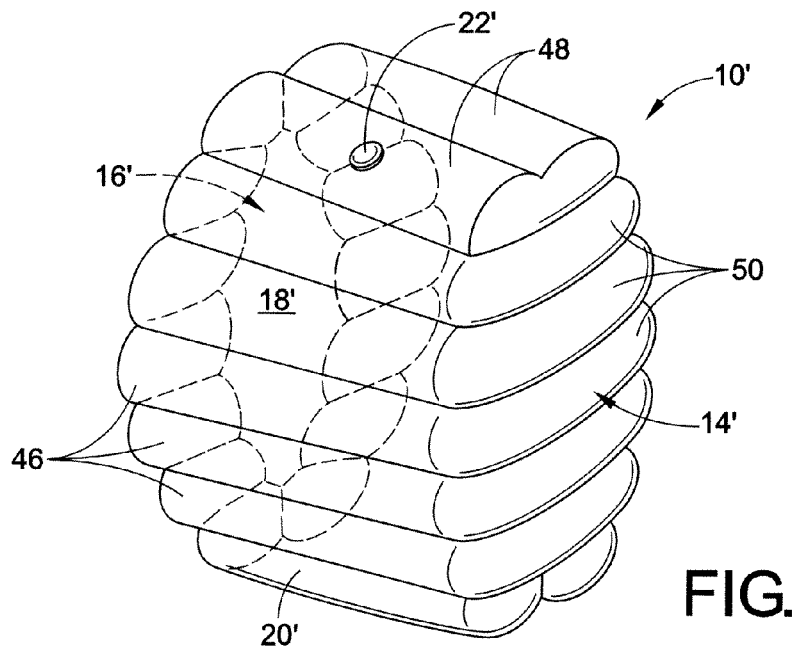
FIG. 8 illustrates a perspective view of the insulator of FIG. 5.

The insulator 10 is shown in FIG. 4 in the inflated state. In the fully-assembled inflated state, the insulator 10 includes at least a first inner oriented layer 26, which is adapted to engage the faucet 100 on opposite sides of the faucet 100. At least a second outer oriented layer 28 is situated beyond the first layer 26 for exposure to the outdoor environment. The first and second layers 26, 28 are formed from a weatherproof material. As used herein, a weatherproof material holds air in the chamber 12 and the ensemble insulates and protects the faucet 100 from exposure to rain, sleet, or snow. Additionally, the material may include an anti-UV component such that an effectiveness of the first and second layers 26, 28 is not reduced by sun rays and airborne pollutants. Additional weatherproof layers may be included with the first and second layers 26, 28. Thus, multiple layers of air in separate chambers may provide a layered insulator 10.

In one embodiment, at least one of the first and second layers 26, 28 may be formed from the weatherproof material. In one embodiment, the weatherproof material may include a PVC vinyl plastic. In one embodiment, the material may include polyethylene (PE). In another embodiment, the weatherproof material may include a textile reinforced plastic. In another embodiment, the material may include a vulcanized rubber. Additional embodiments are contemplated in which the material includes a polyurethane, a nylon, a polyester, and any combination of the above. For example, one embodiment may include a material formed from a polyethylene and nylon blend. One aspect of the nylon is that it tends to reduce a risk of air loss. Additional layers may be included in the insulator 10, wherein such layers include thermal materials. It is anticipated in these embodiments that any additional layer formed from a generally non-weatherproof material may be included between the first and second layers 26, 28.

In one embodiment, the first layer 26 and the second layer 28 are connected to form an insulator 10 having a continuous, closed body. The closed body is defined by the at least one sidewall 20 that tapers toward the closed end 14. An outer perimeter 30 of the insulator body 10 defines the opening 16 that receives the faucet 100. In one embodiment, the first layer 26 and the second layer 28 are connected at least at the perimeter 30 of the cavity 18.

FIG. 3 illustrates a third layer situated between the first and second layers 26, 28. This third layer is more specifically a closed space defined by the first and second layers 26, 28. The third layer includes the air chamber 12 (hereinafter synonymously referred to as "closed space 12") adapted to contain the volume of stationary air that occupies the closed space when the insulator 10 is in the inflated state. In one embodiment, it is contemplated that the third layer may include at least two adjacent sub-chambers 32. Because air is an effective insulator, one aspect of the present disclosure is an inflatable faucet insulator 10 including at least a volume of stationary air contained in the air chamber 12 or in multiple sub-chambers 32 surrounding the exposed faucet components 100.

It is anticipated that after the deflated insulator 10 is inserted over the faucet 100 to cover the faucet 100, air inflated into the insulator body 10, at the valve 22 or an air intake port, causes an inner surface 34 (i.e., of the first layer 26) of the air chamber 12 or sub-chambers 32 to engage a component of the faucet 10. Each sub-chamber 32 of the insulator 10 is compressible. The air may urge the inner surface 34 (i.e., a portion of the first, inner layer 26) of each sub-chamber 32 into a direct, snug contact with the faucet 100. Because the knob 102, the stern region, and the spout 104 have unique shapes of varied diameter, the individual sub-chambers 13 better enable portions of the insulator 10 to easily mold to the adjacent regions of the faucet 100 and hold the insulator 10 in place.

In one embodiment, the sub-chambers 32 may be open at their connection 36 such that the cavity 32 formed between the first and second layers 26, 28 are completely continuous. In another embodiment, the sub-chambers 12 may be only partially open at their connection 36 to adjacent sub-chambers 32 such that air may flow there through to inflate the next sub-chamber 32 in sequence; however, the sub-chambers 32 are partially separated by walls at their connection 36 so that the each one sub-chamber 32 maintains itself as one segment in a multiple segment system.

In one embodiment, each one sub-chamber 32 may be completely closed at its connection 36. The connection 36 may segment an air volume contained in a sub-chamber 32 from an adjacent sub-chamber. In one embodiment, a one-way valve may provide an access between the closed sub-chambers 32. Air inflated in the inport valve 22 may sequentially inflate one sub-chamber 32 at a time. The set of one-way valves (herein synonymously referred to as "serial valves") provide for inflation in one-direction from the input valve 22 to the sub-chamber situated farthest away. One aspect of the serial valves is that a risk of air loss is minimized if there is a puncture to the insulator 10. One aspect of this construction is that the sub-chambers 32 situated sequentially in front of a punctured sub-chamber will not lose their respective air volumes because the one-way valves prevent a reverse air flow. In the embodiment including the one-way valve series, only the sub-chamber 32 that is punctured may tend to lose air while the remaining sub-chambers effectively insulate the faucet until the insulator 10 is selectively discarded.

At least one air pathway may be formed between adjacent sub-chambers 32 of the embodiments. This air pathway provides an access for an air volume input into the valve 22 to travel from the valve 22 toward the farthest situated sub-chamber 32. In one embodiment, the air pathway is defined by the partial openings in the partial connection 36. In another embodiment, the air pathway is formed through a closed connection 36 at the valve series. In another embodiment, at least two pathways may be included between adjacent sub-chambers. The multiple pathways may expedite an inflation of the insulator 10. Another aspect of the multiple pathways is that air movement may not be hindered if a puncture or a fault is incurred in a first pathway.

The individual sub-chambers 12 are at least attached along seams 38 of the insulator body 10 that extend around a circumference of the cavity 18. A plurality of the sub-chambers 32 may include a connection seam 38 on both the first inner oriented layer 26 and the second outer oriented layer 28. The first and second layers 26, 28 generally bulge outwardly beyond the seams 38 when air is occupying the air chamber 12 or sub-chambers 32 after inflation.

FIGS. 1-4 illustrate the first embodiment of the sub-chambers 32 forming the inflatable insulator 10. As is illustrated in both the top front view of FIG. 2 and the elevational view of FIG. 4, the sub-chambers 32 are formed of a plurality of adjacent rings which inflate to create a cylinder of stacked donuts topped by a cone of donuts of decreasing size proximate the closed end 14 of the insulator body 10. A plug is inserted in the hole of the most distal donut relative to the structure to close off the insulator body 10. One ring-shaped sub-chamber 32 defines the perimeter 30 of the opening 16 in the insulator body 10.

FIGS. 5-8 illustrate another embodiment of the insulator 10'. The inflatable insulator embodiment 10' of FIGS. 5-8 is similar to the embodiment discussed for FIGS. 1-4, with similar features identified by similar reference numbers. More specifically, the individual sub-chambers 32' of the discussed embodiment are not ring shaped; rather, each one sub-chamber 32' is elongate or U-shaped. At least two sub-chambers 32' are connected along their longitudinal edges forming a stack of U-shaped chambers 32'. The sub-chambers 32' at the outermost ends of the insulator body 10' have the arms of the U-shape sealed to one another and are separated into parallel legs by a seam with no bottom to the U-shape. More specifically, the U-shaped air sub-chambers 32' include a first leg 46 opposite a second leg 48 situated parallel to the first leg 46 and a third leg 50 connecting the first and second legs 46, 48 at their distal ends. The first and second legs 46, 48 included on each one U-shaped air chamber 32' define the sidewalls of a cavity 18'. The third legs 50 define the closed end 14' of the cavity 18' and of the inflatable insulator 10'.

In this embodiment, the seams 38' connecting each one sub-chamber 32' are situated across the material, thus forming the first layer 26' in a direction parallel to the central axis A that extends between the open end 16' and the closed end 14'. Additional seams 38' connecting the sub-chambers 32' at the closed end 14' extend across a cross-sectional area defining the closed end 14'.

With continued reference to the embodiment illustrated in FIGS. 1-4, a further feature of the inflatable faucet insulator 10 is a closure 54 to snugly prevent a risk of heat leakage at the opening 16 and/or an air current from traveling through the opening 16' after the insulator 10 is assembled. In one embodiment, the closure 54 is a cinch strap (herein synonymously referred to as a "draw string closure", an "elastic strap", an "elastic tie" or a "cord"), as illustrated in FIG. 3, situated about the perimeter 30 (FIG. 4) of the inflatable insulator body 10. The closure 54 may encircle the insulator cover 10 near the opening 16, or it may extend through a channel (not shown) adjacent an interior surface of the first or second layer 26, 28 occupying the cavity 18. The terminal ends of the cord 54 are exposed for manipulation. Once the deflated first and second layers 26, 28 are inserted over the exposed faucet components 100, the cord 54 is manipulated to constrict the perimeter 30 to a tight, snug fit in contact with the portion of the faucet 100 adjacent a wall. It is further anticipated that the perimeter 30 of the insulator body 10 is in contact with a structure 110 or surface of which the faucet 100 protrudes outwardly from. This structure 110 may include a wall in a non-temperature controlled environment. Alternately, it may include a ground surface.

Other embodiments of features are contemplated for contracting the perimeter 30 without departing from the main teachings of the present disclosure. Any closure means 54 is contemplated that enables the perimeter 30 to tighten around the faucet 100 at the wall which essentially closes off the opening 16.

One aspect of the present insulator 10 embodiments, including the construction which permits the perimeter 30 to constrict, is certain flexibility in the material forming the first and second layers 26, 28. It is anticipated that at least the first layer 26 is formed of a generally flexible material that is shapeable to engage the faucet 100. It is anticipated that air being input into the chamber 12 is the force that urges against this first layer 26 and ultimately shapes it. In one embodiment, the second layer 28 is furthermore flexible. These first and second layers 26, 28 may be flattened, folded, rolled, or similarly situated adjacent to and/or in contact with one another when the insulator body 10 is in a deflated state.

Figure 9:
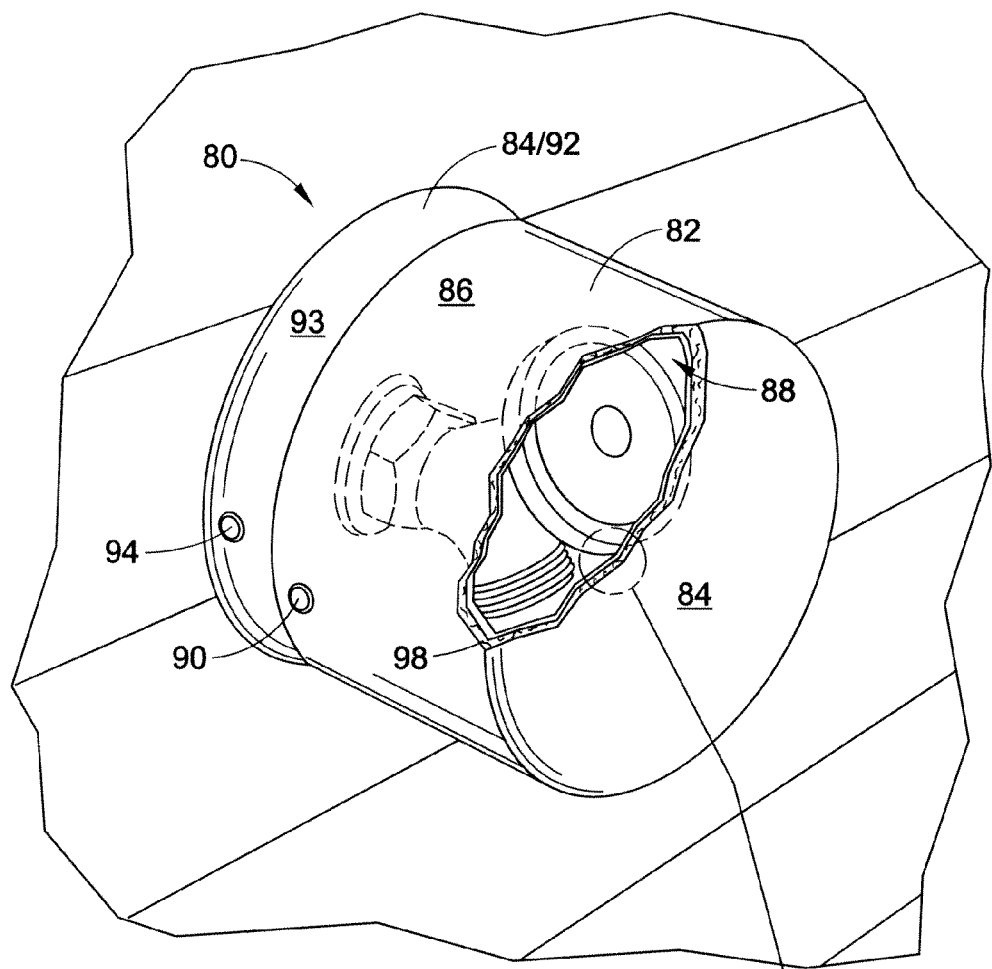
FIG. 9 illustrates a perspective partial view of another embodiment of an inflatable faucet insulator in accordance with the present disclosure.
Figure 9:
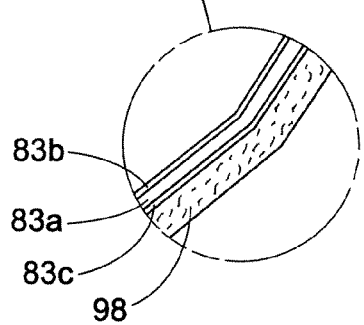

FIG. 9 illustrates a further embodiment of the inflatable faucet insulator 80 positioned over a faucet 100. The inflatable insulator 80 includes a body portion defined by at least a first air chamber 82 having a generally conical shape that terminates at a closed end 84. In one embodiment, the air chamber 82 can decrease in general size toward the closed end 84 of the inflatable insulator 80. Opposite the closed end 84 is an opening 86 (partially shown in phantom). The opening 86 provides access to a cavity 88, which is defined by a generally continuous sidewall that defines the air chamber. The sidewall is formed from a stationary air layer 83*a* provided between first and second impermeable layers 83*b*, 83*c*. A first valve 90, or air port, or similar functioning feature is situated on the outer-oriented impermeable layer of the sidewall.

The discussed embodiment further includes a baffle 92 situated about a distal edge of the sidewall which defines the opening 86. The baffle 92 can include a second selectively inflatable air chamber that is defined by a closed, impermeable sidewall 96 containing a volume of stationary air. In one embodiment, the baffle can include a downward hook. In one embodiment, the closed sidewall 96 of the baffle 92 is attached to the first air chamber 82, but there is otherwise no provided access for the stationary volume of air to flow from one of the first air chamber 82 and the second air chamber of the baffle 92 to another of the first air chamber 82 and second air chamber of the baffle 92. Accordingly, the baffle 92 includes a second valve 94, which provides the baffle with a means to selectively inflate the baffle separately from the selective inflation of the first air chamber 82 on the body portion. In this manner, the user can position the inflatable insulator 80 over the faucet 100 and selectively inflate the first air chamber 82 through the first valve 90 until it provides a snug fit over the faucet. The user can then selectively inflate the second air chamber of the baffle 92 through the second valve 94 to urge the inflatable insulator 80 against the structure 110 and thus providing a seal that reduces a risk of air flow reaching the cavity 88 of the inflatable insulator 80.

In yet another embodiment, additional layers are optionally provided for positioning over the faucet 100 in addition to the inflatable insulator 10. One embodiment includes an insulated sock feature formed from a stretch material that slides over the faucet before the insulator is positioned over the faucet. A drawstring can tighten the opening of the sock around the neck of the faucet spout. The sock feature can be included with the inflatable insulator in a kit embodiment.

A further embodiment is contemplated as including a reflective film layer 98 situated about at least one of an inside or outside of the sidewall defining the inflatable insulator. FIG. 9 illustrates a reflective film layer 98 formed on, or attached to, the first or second layer of the sidewall. In another embodiment, the reflective layer 98 can include a sock that is wrapped around the faucet before the inflatable insulator is positioned on the faucet. Alternatively, the reflective film layer 98 can be positioned over the inflatable insulator after the insulator is selectively inflated over the faucet. The reflective film layer 98 may enhance insulation value In the present disclosure, it is anticipated that the insulator 10 and optional cooperating covers are in the deflated state at a point of sale. One aspect of a sale of insulators 10 in the deflated state is a reduction in transportation and/or shipment costs from the manufacturer to the distributor or from the distributor to the purchaser. Another aspect of insulators 10 being provided in a deflated state is less space consumption on the shelves at retail. A third aspect of inflatable insulators 10 or insulator kits provided in a deflated state is a better manipulation of the insulator 10 onto the outdoor faucet 100, wherein an inflation of the air layer 32 into the insulator 10 becomes the urging force that positively conforms the inner oriented first layer 26 to the faucet 100 surfaces.

Accordingly, it is anticipated that the first and second layers 26, 28 of the present faucet insulator cover 10 is first placed onto the faucet 100 in a deflated state and then the stationary air layer is input in the chamber 12 between the first and second layers 26, 28. This stationary air layer provides an insulating layer between the faucet 100 and the outer second layer 28. The air inflated into the insulator 10 creates a space completely surrounding the outdoor faucet body 100 for preventing a transfer of heat from the faucet 100 to another body and for preventing a movement of air current against the faucet body 100. Accordingly, the chamber 12 prevents a movement of air current from transferring heat from the faucet body 100 to an outdoor environment.

In the anticipated embodiment, the inflatable insulator 10 is a seasonal, consumable apparatus and/or device that protects the water pipe connecting to a faucet 100 for several months of low temperature. It is anticipated that the first and second layers 26, 28 are formed of a generally inexpensive material, which permits the insulator 10 to be recycled or discarded at the end of the season with low costs to the consumer. Furthermore, these costs may be offset in savings to utility expenses related to the faucet 100 and/or as a lowered risk of monitoring, servicing, and/or replacing the water pipe connecting to the faucet 100.

The material forming the first and/or second layers 26, 28 is preferably durable and sturdy enough to withstand both the climate and other elements, such as, for example, punctures from an impact of wind-blown debris, etc. However, the material is also preferably easily manipulated and deformed. When temperatures warm, the present insulator 10 is removed from its position on the faucet 100 by a simple action of pulling it away. The insulator 10 is then recycled or discarded In alternate embodiments, however, it is anticipated that a reusable insulator be capable of covering the faucet 100 for multiple seasons. In one embodiment, the valve 22 may include a two way valve, wherein the stationary air contained within the chamber 12 between the first and second layers 26, 28 may be controllably emptied therefrom. It is contemplated that a closure (not shown) covers the valve 22, and the closure is removed there from to let the air egress the insulator 10. When the stationary air layer is no longer occupying the chamber 12 between the first and second layers 26, 28, the first and second layers 26, 28 are more free to be flexibly pulled away from the faucet 100 and temporarily stored in a deflated, flattened, folded and/or rolled state.

In one embodiment the material forming the first and second layers 26, 28 may be a generally transparent or clear material offering at least a partial visibility of the faucet 100 contained in the cavity. In other embodiments, it is contemplated that at least the second layer 28 is colored. For example, the second exposed layer 28 may include a color matching that of the structure 110 façade that the faucet 100 extends from. A matching color may make it inconspicuous to onlookers of the property. In yet another embodiment, the color may be bold so that the faucet 100 location may be quickly identified at a later date.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An outdoor faucet cover for insulating an associated outdoor faucet in freezing climates, comprising:
   a selectively inflatable insulator body defined by a first open end, a closed end opposite the open end, and at least one continuous sidewall between the closed end and the open end, the continuous sidewall forming multiple air chambers;
   a cavity formed therein the inflatable body for receipt of the associated faucet;
   a valve adapted for selectively receiving air inflated into the insulator body, wherein a received volume of stationary air causes an inner surface of each air chamber to at least partially conform into direct, snug contact with an adjacent component of the associated faucet that the each one air chamber comes into contact with; and,
   wherein the insulator body is formed from at least one layer of UV resistant weatherproof material;
   a cinch strap encircling a perimeter of the insulator body adjacent the first open end and constricting the first open end of the insulator body to a snug fit around both an associated end of the associated faucet and any associated exposed water line of which the associated end engages;
   wherein the valve comprises a series of one-way valves for sequentially inflating each of the multiple air chambers one at a time;
   the series of one-way valves inflate the insulative cover in one direction; and,
   a reflective film layer situated along at least one of first and second layers.

2. An insulator for covering an outdoor faucet during a season, the insulator comprising:
   a first weatherproof layer adapted to engage an associated outdoor faucet body;
   a second weatherproof layer adapted to be exposed to an associated outdoor environment;
   selectively inflatable sub-chambers being adapted to contain an air layer situated between the first and the second weatherproof layers;
   wherein air inflated into the insulator urges the first weatherproof layer of each sub-chamber to flexibly conform into direct, snug contact with an adjacent component of the associated outdoor faucet body, and wherein the air inflated into the insulator further creates a space surrounding the associated outdoor faucet body for preventing a movement of air current, thus precluding the air current from transferring heat from the associated outdoor faucet body to the outdoor environment;
   a third reflective film layer positioned about the second weatherproof layer for enhancing insulation value of the insulator;
   an independently selectively inflatable baffle; and,
   the baffle is selectively inflatable separately from the selectively inflatable sub-chambers, whereby the baffle is urged against a mounting structure of the associated outdoor faucet body, thereby providing a seal around the structure for reducing airflow within the space surrounding the associated outdoor faucet body.

3. The insulator of claim 2, wherein the first weatherproof layer and the second weatherproof layer are connected to form a closed, continuous body defining the chamber adapted to contain the air layer.

4. The insulator of claim 3, wherein the closed continuous body further defines a cavity including an open end adapted to receive the associated outdoor faucet, a closed end opposite the open end, and a continuous sidewall between the open end and the closed end.

5. The insulator of claim 2, wherein the chamber is adapted to contain the air layer between the first and the second weatherproof layers after the first and second weatherproof layers are placed over the associated outdoor faucet body.

6. The insulator of claim 2, wherein the first and second weatherproof layers include a plurality of connected sub-chambers.

7. The insulator of claim 6, wherein at least two of the sub-chambers are situated in a generally conical relationship such that the sub-chambers form a closed end of the insulator.

8. The insulator of claim 6, wherein the sub-chambers are formed of parallel rings.

9. The insulator of claim 6, wherein the sub-chambers are formed of a plurality of elongate bodies defining the sidewalls and a closed end of the the insulator.

10. The insulator of claim 9, wherein at least one of the elongate bodies is U-shaped.

11. The insulator of claim 2, further including an air input valve for inflating the insulator when the insulator is placed over the associated outdoor faucet body.

12. The insulator of claim 2, wherein at least the second weatherproof layer is formed from a material selected from a group comprising:
   a polyethylene;
   a PVC vinyl plastic;
   a textile reinforced plastic;
   a vulcanized rubber;
   a polyurethane;
   a nylon;
   a polyester; and,
   any combination of the above.

13. The insulator of claim 2, wherein the insulator is adapted to be reusable or consumable.

14. A reusable inflatable structure having an independent, weatherproof cover, comprising:
   a first weatherproof layer adapted to engage an associated outdoor faucet body;
   a second UV resistant weatherproof layer adapted to be exposed to an associated outdoor environment;
   multiple selectively inflatable sub-chambers each adapted to contain an air layer situated between the first and the second weatherproof layers, the air layer being adapted to urge each sub-chamber into direct, snug contact with an adjacent region of the associated outdoor faucet body;
   an independently selectively inflatable baffle;
   the baffle is selectively inflatable separately from the selectively inflatable sub-chambers, whereby the baffle is urged against a mounting structure of the associated outdoor faucet body, thereby providing a seal around the structure for reducing airflow within the space surrounding the associated outdoor faucet body; and,
   a third reflective film layer positioned about the second weatherproof layer for enhancing insulation value of the insulator.

15. A consumable inflatable structure having an independent, weatherproof cover, comprising:
   a first weatherproof layer adapted to engage an associated outdoor faucet body;
   a second UV resistant weatherproof layer adapted to be exposed to an associated outdoor environment;
   multiple selectively inflatable sub-chambers each adapted to contain an air layer situated between the first and the second weatherproof layers, the air layer being adapted to urge each sub-chamber into direct, snug contact with an adjacent region of the associated outdoor faucet;

an independently selectively inflatable baffle;

the baffle is selectively inflatable separately from the selectively inflatable sub-chambers, whereby the baffle is urged against a mounting structure of the associated outdoor faucet body, thereby providing a seal around the structure for reducing airflow within the space surrounding the associated outdoor faucet body; and, a third reflective film layer positioned about the second weatherproof layer for enhancing insulation value of the insulator.

* * * * *